United States Patent [19]

Jensen

[11] 4,192,290
[45] Mar. 11, 1980

[54] COMBINED SOLAR COLLECTOR AND ENERGY STORAGE SYSTEM

[75] Inventor: Ronald N. Jensen, Hampton, Va.

[73] Assignee: The United States of America as represented by the Administrator of the National Aeronautics and Space Administration, Washington, D.C.

[21] Appl. No.: 900,843

[22] Filed: Apr. 28, 1978

[51] Int. Cl.² ............................................. F24J 3/02
[52] U.S. Cl. .................................... 126/437; 126/434; 165/32; 126/419
[58] Field of Search ............... 126/270, 271, 419, 418, 126/422, 428, 430, 434, 450, 437; 237/1 A; 165/32, 49, 106

[56] References Cited

U.S. PATENT DOCUMENTS

| 2,388,940 | 11/1945 | Taylor | 126/271 |
|---|---|---|---|
| 2,595,905 | 5/1952 | Telkes | 237/1 A |
| 4,027,821 | 6/1977 | Hayes et al. | 126/400 X |
| 4,033,325 | 7/1977 | Walker | 126/434 |
| 4,050,508 | 9/1977 | Buckley | 126/271 |
| 4,051,890 | 10/1977 | Melchior | 165/32 |
| 4,082,080 | 4/1978 | Pittinger | 126/271 |
| 4,083,490 | 4/1978 | Cunningham et al. | 126/419 |
| 4,116,222 | 9/1978 | Seifried | 126/271 |
| 4,137,964 | 2/1979 | Buckley | 165/32 X |
| 4,149,589 | 4/1979 | Hopman | 165/32 |

Primary Examiner—James C. Young
Assistant Examiner—Larry Jones
Attorney, Agent, or Firm—Wallace J. Nelson; John R. Manning; Howard J. Osborn

[57] ABSTRACT

A combined solar energy collector, fluid chiller and energy storage system. A movable interior insulated panel in a storage tank is positionable flush against the storage tank wall to insulate the tank for energy storage. The movable interior insulated panel is alternately positionable to form a solar collector or fluid chiller through which the fluid flows by natural circulation.

6 Claims, 7 Drawing Figures

COMBINED SOLAR COLLECTOR AND ENERGY STORAGE SYSTEM

ORIGIN OF THE INVENTION

The invention described herein was made by an employee of the United States Government and many be manufactured and used by or for the Government for governmental purposes without the payment of any royalties thereon or therefor.

BACKGROUND OF THE INVENTION

This invention relates to a solar heating system. More particularly it relates to a solar heating system comprising a combined solar collector, liquid chiller, and storage tank, featuring a movable thermally actuated interior insulated panel. Most solar heating systems in the prior art have used flat plate collectors separate from a storage tank. These systems usually require a pumping action to move hot fluid from the collector into a storage tank which is lower than the collector. Also, the collectors are subject to freezing unless complicated evacuation systems are provided or expensive non-freeze fluids are used.

There have been some systems which have combined collectors and storage tanks, e.g., the Steve Bear house in Arizona or the Harold Hays "Skytherm" house. These systems are usually equipped with external insulation which require physical manipulation to make the system work. They also limit the heater to a southern wall or ceiling, thus the structure must be built to suit the needs of the collector.

Thermal diodes have also been offered as a means to keep energy in storage ("Proceedings of the Workshop on Solar Energy Storage Subsystems for Heating and Cooling of Buildings", Apr. 16–18, 1975, NSF-RA-75-041, page 141, "Storage Aspects of Thermic Diode Solar Panels".). For these systems to work, piping must be incorporated into the collector and employed very carefully. Thermal diodes also do not eliminate freeze unless expensive nonfreeze fluids are used. The boiling and freezing of the fluid in the collector has always been a problem with solar energy heating systems. The present invention neatly solves the problem by utilizing a movable insulated panel inside the storage tank. In the collecting mode the interior panel is moved away from the storage tank wall thus forming a solar collector composed of a transparent thermal cover, the tank wall, the working fluid and the movable interior panel. The fluid moves from the tank and through the collector and back to the tank by natural circulation. The chilling mode is similar to the collecting mode with the transparent cover removed such that heat radiates from the tank wall to the environment. In the storage mode the movable interior insulated panel is moved up flush to the tank wall thus eliminating the collector fluid flow path and evacuating practically all fluid from the collector. In the storage mode heat transfer between the tank fluid and the tank environment is essentially eliminated thus precluding possibility of freezing or boiling of the fluid.

OBJECTS OF THE INVENTION

It is an object of the present invention to provide a combined solar collector, fluid chiller, and energy storage system in a single unit such that external piping is eliminated.

It is a further object of the invention to provide a solar system which utilizes a natural circulation collector such that pumps are eliminated.

It is another object of the invention to provide a combined solar collector, fluid chiller, and energy storage in which an easy and simple method is employed to preclude freezing or boiling of the system fluid in the collector.

Other objects and advantages of the present invention will be readily apparent from the following description and drawings which illustrate a preferred embodiment of the present invention.

SUMMARY OF THE INVENTION

The present invention involves a combined solar energy collector, fluid chiller, and energy storage system. The invention includes a liquid filled, thermally insulated fluid storage tank of which one wall is a solar radiation collector, a thermal insulated panel located inside the storage tank which is parallel to and is movable with respect to the collector wall whereby the heat transfer between the tank liquid and the collector surface is regulated by positioning of the interior insulated movable panel.

DESCRIPTION OF THE PREFERRED EMBODIMENT

Figure 1:
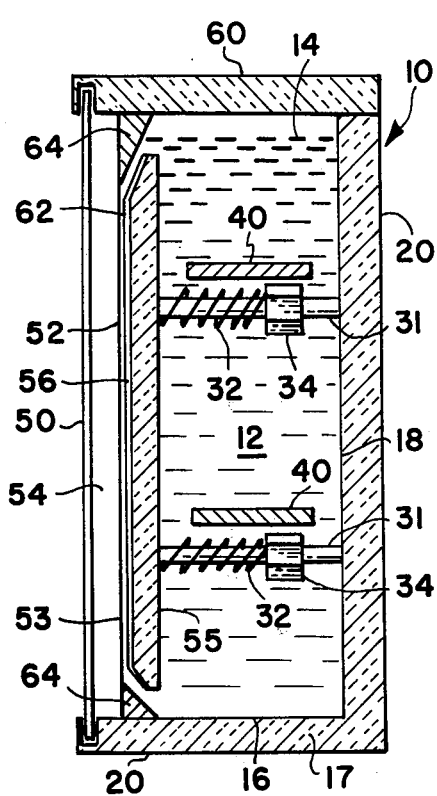
FIG. 1 is an elevational sectional view of a combined solar energy collector, fluid chiller, and energy storage system in the storage mode as taken along line I—I of FIG. 3.

FIG. 1 shows an elevational sectional view of the preferred embodiment of a combined solar energy collector, fluid chiller, and energy storage system. A water storage tank generally designated by the reference numeral 10, includes a rectangular horizontal base 16 with rear wall 18 and sidewalls 28 (shown in FIG. 3) extending vertically upward therefrom. Tank 10 is open at the top and is filled with water 12 to level 14.

Base 16 and walls 18 and 28 are insulated with conventional thermal insulation 17. The front wall of tank 10 is a collector wall 52 which is coated with solar radiation absorptive paint 53 on the exterior side. Spaced from the collector wall 52 is a transparent panel 50 through which solar radiation may pass. A stagnant air space 54 is maintained between transparent panel 50 and collector wall 52 to thermally insulate collector wall 52 from the outside environment. The transparent panel 50 as well as the rest of the system is supported by housing 20 which covers all surfaces of tank 10 except the collector wall 52. A removable cover 60 having thermal insulation 17 is fitted to seal the tank 10 at the top from the outside environment.

A movable thermal insulation panel designated generally by the reference numeral 62, is located inside tank 10. Movable panel 62 is constructed of insulation material having insulating properties unaffected by submursion in water 12. Two to four inches of cellular glass 55 is utilized for panel 62 in the preferred embodiment, with one-half inch of a soft and flexible cellular insulation 56 such as "ARMFLEX" on the front to provide an efficient seal when panel 62 is pressed against collector wall 52. Front tie pins 30 and rear tie pins 31 extend from walls 52 and 18, respectively to threaded turnbuckles 34. The tie pins 31 and 30 support the walls to preclude bulging thereof due to water pressure; the threaded turnbuckle 34 provides a tensing adjustment for tie pins 31 and 30.

Figure 6:
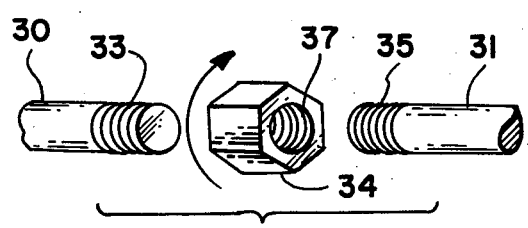
FIG. 6 is an exploded perspective view of tie pins and turnbuckle employed in the present invention.

Referring now to FIG. 6, there is shown an exploded view of turnbuckle 34 and tie pin 30 assembly as employed in the present invention. Threads 33, 35 and 37 are designed such that rotating turnbuckle 34 in the direction of the arrow brings the threaded ends of tie pins 30 and 31 closer together thus increasing tension; and rotating turnbuckle 34 in the direction opposite of the arrow will decrease tension. Tie pin 30 also extends through holes 42 (in FIG. 3) in panel 62 thus also serving as a track whereby panel 62 is supported and upon which it may slide.

Figure 2:
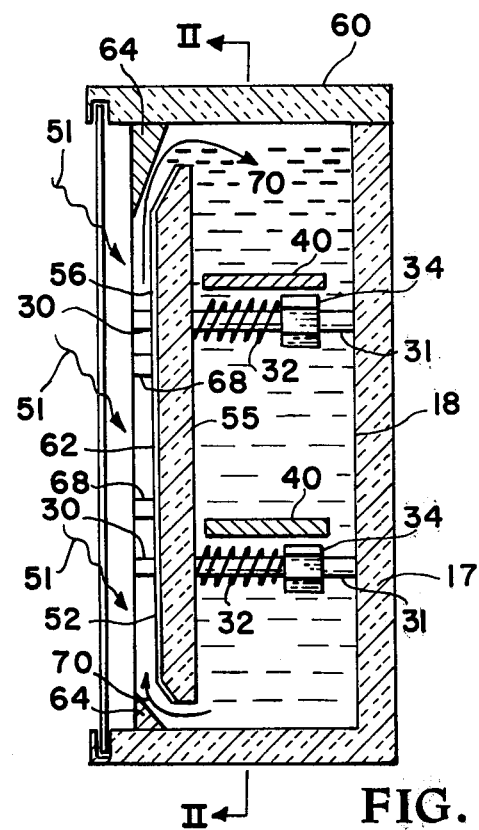
FIG. 2 is an elevational sectional view similar to FIG. 1 and showing the system in the heat transfer mode.

Referring to FIG. 2, springs 32 exert a force between turnbuckles 34 and panel 62 sufficient to press panel 62 flush against wall 52 and perimeter insulation seals 64. Movable panel 62 may be moved toward turnbuckle 34 by actuating thermal actuators 68, anchored on collector wall 52 or insulation panel 62, which exert a force on panel 62 in opposition of the force of springs 32 and of sufficient magnitude to move panel 62 along tie pin 30 away from wall 52. In the preferred embodiment, a thermal actuator 68 is located near each tie pin 30.

Thermal actuators 68 of the preferred embodiment are designed to expand when wall 52 reaches a temperature of 110° F. Alternatively, they may be designed to allow the panel to move back when the temperature of wall 52 exceeds the water 12 temperature or to remain closed under all circumstances when the wall 52 reaches temperatures near freezing or near boiling of water 12.

Figure 7:
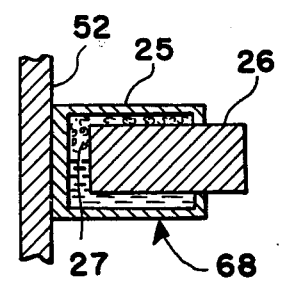
FIG. 7 is a sectional view of a thermal actuator employed in the present invention.

The thermal actuator 68 is shown in more detail in FIG. 7. A piston 26 is slidably positioned in housing 25 to seal in a condensible gas 27. As the temperature of actuator 68 increases, the gas 27 expands and vaporizes and pushes apart piston 26 and housing 25. In an alternative thermal actuator construction, freon is contained in a bellows similar to that of an automobile thermostat having a pressure plate unit and as the freon heats up, it expands, in turn expanding the bellows and urging the pressure plate 26 against, and consequently moving, panel 62. Other apparatus for moving panel 62 may be used in place of actuator 68 including, but not limited to, electric motors, external mechanical or pneumatical devices and the like. Also, the buoyancy (whether positive or negative) of the panel 62 material may be utilized for moving panel 62.

Referring back of FIG. 2 stratification panels 40 enhance thermal stratification of water 12, whereby a greater temperature difference is achieved between the temperature of water 12 at the top of tank 10 and at the bottom 16 of tank 10 and furthermore since thermal mixing is inhibited, a higher water temperature is obtained at the top of tank 10 than would be possible without stratification.

Water level 14 is maintained above the top of movable panel 62 thus permitting the flow of water 12 thereover.

Figure 3:
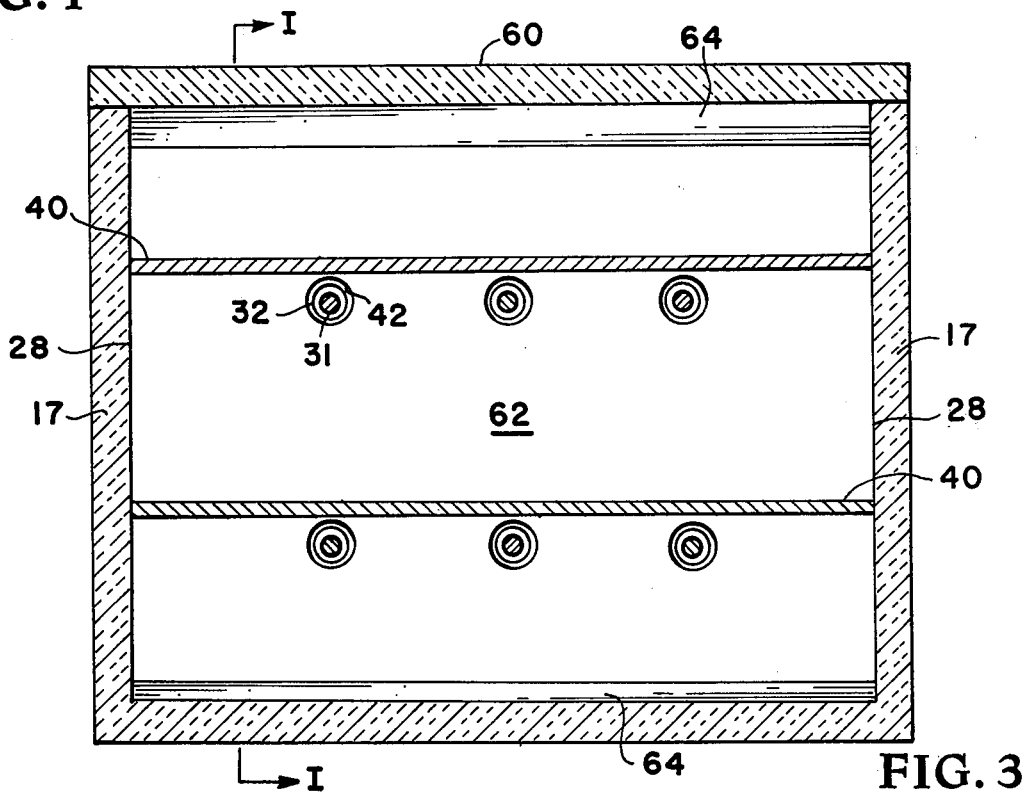
FIG. 3 is an elevational sectional view taken along line II—II of FIG. 2.

Referring now to FIG. 3 there is shown a sectional view of a combined solar energy collector, fluid chiller and energy storage system from the rear. As shown therein, stratification panels 40, movable panel 62, and perimeter insulation seals 64 run the width of tank 10. Perimeter insulation seals 64 are affixed to tank bottom 16 and collector wall 52. Sidewalls 28 are insulated with conventional thermal insulation 17 and extend vertically upward from base 16. This view also shows holes 42 in movable panel 62.

The system is operable in four modes: the solar radiation collecting mode; the energy storage mode; the liquid chilling mode; and the energy use mode.

FIG. 1 shows the system in the energy storage mode. Movable panel 62 is flush against collector wall 52 and perimeter insulation seals 64. In the energy storage mode heat transfer is essentially precluded between tank fluid 12 and the outside environment. Freezing of the water film between the collector wall 52 and the movable panel 62 will not cause failure due to its thickness.

FIG. 2 shows the system in the solar energy collecting mode. Thermal actuators 68 have pushed back movable panel 62 creating a fluid flow path, designated by arrow 70, between movable panel 62 and collector wall 52 and perimeter insulation seals 64. Solar radiation 51 strikes and heats collector wall 52. The heat is transferred to fluid 12 in flow path 70 by conduction and convection between fluid 12 and collector wall 52. Fluid 12 moves upward through flow path 70 by natural circulation and into tank 10.

The system in the liquid chilling mode is similar to that of the solar collecting mode of FIG. 2 except the transparent panel 50 may be removed and the actuators (mechanical type) are worked opposite of the solar collecting mode. The fluid chilling mode is used when the exterior environment temperature is less than the temperature of fluid 12 and it is desired to decrease the fluid 12 temperature. Under these conditions fluid 12 will flow downward, through flow path 70 by natural circulation giving up heat by conduction and convection through collector wall 52 to the exterior environment.

Figure 4:
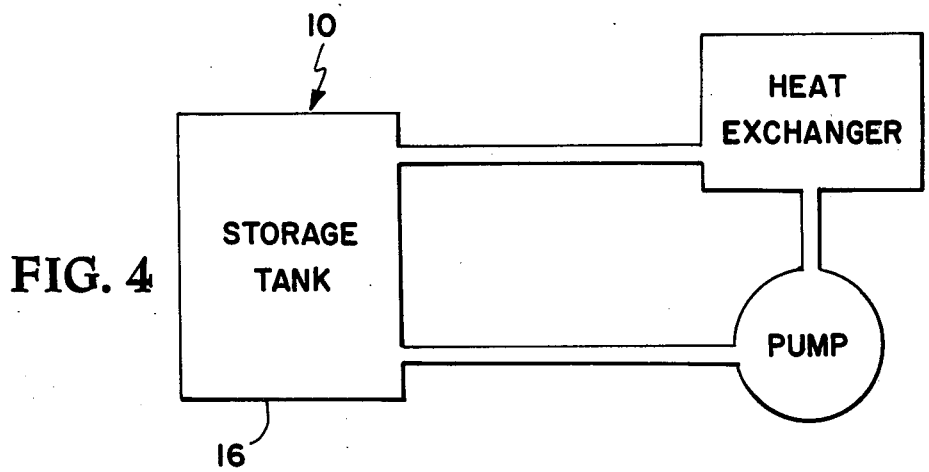
FIG. 4 is a schematic diagram showing the hookup of an external heat exchanger to the system.

FIG. 4 is a schematic showing a system capable of utilizing fluid 12 for heating or cooling purposes: the energy use mode. For heating, hot fluid 12 from the top of tank 10 is pumped to a heat exchanger, e.g., a radiator, where the fluid 12 gives up heat, and is then cycled back to the bottom of the tank 16 to be reheated. For cooling, cool fluid 12 from the bottom of tank 10 is pumped to a heat exchanger, where the fluid 12 gains heat, and is then recycled back to the top of tank 10 and cooled.

Figure 5:
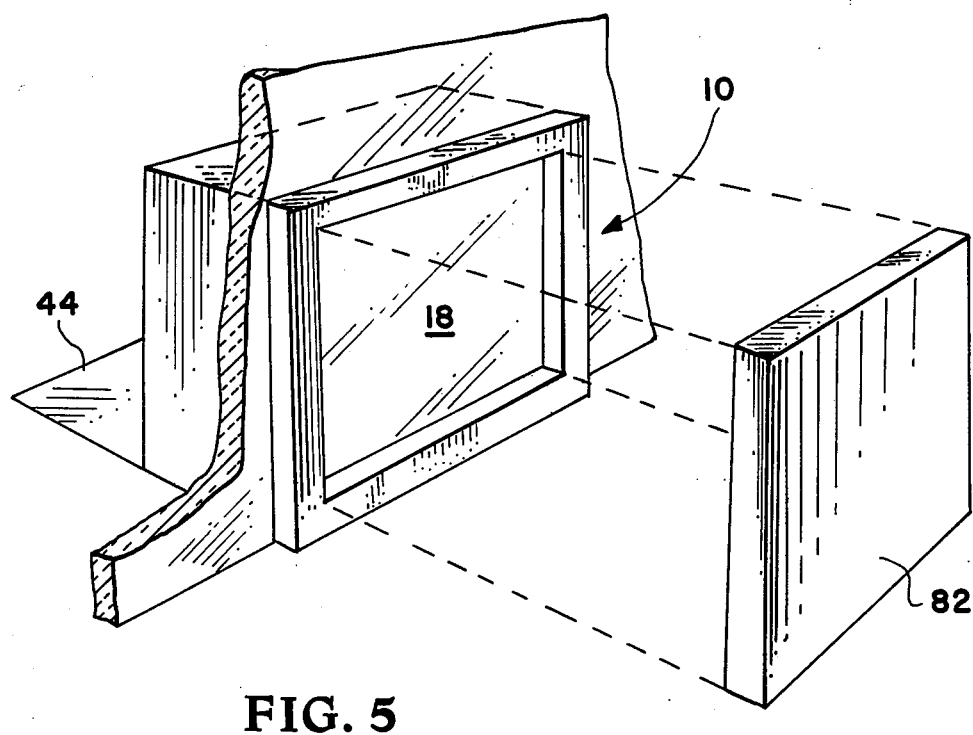
FIG. 5 is a perspective view showing a removable secondary panel.

As shown in the exploded perspective view of FIG. 5, a secondary panel 82, removable to expose tank wall 18 to a room to be heated or cooled by heat transfer between the air in the room and fluid 12 in tank 10 via wall 18, may be employed either exterior to or interior to the wall 18. Also, a solar radiation reflector 44 positionable to reflect the sun's rays onto collector wall 52 may be used. Alternatively, tank 10 may be constructed with wall 52 tilted at an optimum angle to the sun.

The above description and drawings are only illustrative of one embodiment which achieves the objects, features and advantages of the present invention, and it is not intended that the present invention be limited thereto. All modifications of the present invention which come within the spirit and scope of the following claims are considered part of the present invention.

What is claimed is:

1. A combined solar energy collector, fluid chiller, and energy storage system comprising:
   (a) a tank for containing a liquid;
   (b) a solar energy collector surface forming a wall of said tank;
   (c) a thermal insulation means for thermally insulating said liquid contained in said tank from the exterior environment of said tank, said thermal insulation means including a thermal insulation panel located inside said tank, the major surface of said panel being parallel with the collector wall;
   (d) thermally responsive panel moving means positioned to move the insulating panel to or from a first position in which the panel is displaced from said collector surface to allow the liquid to move into contact with the collector surface, to a second position where the panel affronts the collecting wall; whereby heat transfer between said liquid and said collector wall is controlled by the movement of said thermal insulation panel between said first and second positions while maintaining the parallel relationship between said collector wall and said thermal insulation panel said panel in said second position forms with the other surfaces of said tank an insulating enclosure for said liquid.

2. A combined solar energy collector, fluid chiller, and energy storage system as in claim 1 and further comprising a transparent panel positioned parallel to and spaced from said collector wall of said tank.

3. A combined solar energy collector, fluid chiller, and energy storage system as in claim 1 wherein said panel moving means comprises a thermal actuator to trigger a desired move of said panel parallel to and away from said collector wall when said liquid attains a predetermined temperature, a set of spaced front and rear tie pins perpendicular to and supporting said thermal insulation panel, each front tie pin being threadingly connected to a corresponding rear tie pin by a turnbuckle, said front tie pins extending from the collector wall and slideably received through said thermal insulation panel, a set of springs corresponding to said set of front and rear tie pins, each spring positioned around and with its longitudinal axis parallel to one of said said front tie pins, and each spring positioned between and pushing against said thermal insulation panel and one of said turnbuckles.

4. A combined solar energy collector, fluid chiller, and energy storage system as in claim 1 wherein a plurality of stratification panels are positioned horizontally inside said tank.

5. A combined solar energy collector, fluid chiller, and energy storage system as in claim 1 wherein said liquid is circulated from said tank through a remote heat exchanger and returned to said tank.

6. A combined solar energy collector, fluid chiller, and energy storage system as in claim 1 and further comprising a second insulating panel corresponding to a portion of the wall of said tank, said wall being exposable to an air space and said insulating panel being movable to allow regulation of heat transfer between said liquid and said air space.

* * * * *